United States Patent
Fedorov et al.

(10) Patent No.: US 9,756,186 B2
(45) Date of Patent: Sep. 5, 2017

(54) PORTABLE CONTINUITY OBJECT

(71) Applicant: Genesys Telecommunications Laboratories, Inc., Daly City, CA (US)

(72) Inventors: Sergey Fedorov, Moraga, CA (US); Mikhail Gilula, Foster City, CA (US); Derek Barnes, San Jose, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 0 days.

(21) Appl. No.: 14/170,535

(22) Filed: Jan. 31, 2014

(65) Prior Publication Data

US 2014/0241518 A1    Aug. 28, 2014

Related U.S. Application Data

(63) Continuation of application No. 12/701,906, filed on Feb. 8, 2010, now Pat. No. 8,681,970.

(51) Int. Cl.
*H04M 3/523* (2006.01)

(52) U.S. Cl.
CPC ...... *H04M 3/523* (2013.01); *H04M 2203/404* (2013.01); *H04M 2203/551* (2013.01); *H04M 2203/552* (2013.01)

(58) Field of Classification Search
USPC .............. 379/265.02, 265.12, 88.02, 114.13
See application file for complete search history.

(56) References Cited

U.S. PATENT DOCUMENTS

| 6,744,878 | B1 | 6/2004 | Komissarchik et al. |
| 6,870,912 | B2 * | 3/2005 | Bennett, III ........ H04L 12/5692 379/90.01 |
| 7,711,105 | B2 * | 5/2010 | Basson et al. ........... 379/265.12 |
| 8,681,970 | B2 | 3/2014 | Fedorov et al. |

(Continued)

FOREIGN PATENT DOCUMENTS

| CN | 102754418 A | 10/2012 |
| EP | 1030504 A2 | 8/2000 |

(Continued)

OTHER PUBLICATIONS

Office action for Chinese Patent Application No. 201180008782.8 mailed Jun. 20, 2014 by SIPO, with English Translation, 14 pages.

(Continued)

*Primary Examiner* — Amal Zenati
(74) *Attorney, Agent, or Firm* — Lewis Roca Rothgerber Christie LLP

(57) ABSTRACT

A method for providing continuity over a series of transactions is provided, comprising the steps of (a) creating a Portable Continuity Object (PCO) as a defined digital package by an instance of PCO software executing on a computerized appliance also capable of communication transaction; (b) providing identity of a person, an address of a communication device and a continuity context in the PCO; (c) sharing the PCO in related transactions, with the PCO updated with information concerning individual transactions by digital equipment enhanced with an instance of PCO software; and (d) providing context continuity in succeeding transactions by accessing the PCO by one or both parties to a transaction.

18 Claims, 3 Drawing Sheets

(56) References Cited

U.S. PATENT DOCUMENTS

| | | |
|---|---|---|
| 2002/0188513 A1 | 12/2002 | Gil et al. |
| 2004/0223593 A1* | 11/2004 | Timmins et al. .......... 379/88.02 |
| 2004/0240655 A1 | 12/2004 | Swick |
| 2005/0141694 A1 | 6/2005 | Wengrovitz |
| 2006/0146806 A1 | 7/2006 | Khuc et al. |
| 2006/0251238 A1* | 11/2006 | Richartz ............... H04M 3/523 379/265.12 |
| 2007/0003050 A1 | 1/2007 | Ebling et al. |
| 2007/0041551 A1* | 2/2007 | Whitecotten et al. ... 379/212.01 |
| 2009/0150225 A1 | 6/2009 | Knott et al. |
| 2014/0025540 A1* | 1/2014 | Hendrickson .......... G06Q 30/02 705/26.81 |

FOREIGN PATENT DOCUMENTS

| | | |
|---|---|---|
| EP | 2534822 A1 | 12/2012 |
| JP | 09-297717 A | 11/1997 |
| JP | 2000-66998 A | 3/2000 |
| JP | 2001125632 A | 5/2001 |
| JP | 2003-532211 A | 10/2003 |
| JP | 2009-116572 A | 5/2009 |
| JP | 2013-519159 A | 5/2013 |
| WO | WO 01/82571 A2 | 11/2001 |
| WO | WO 2011/097097 A1 | 8/2011 |

OTHER PUBLICATIONS

Japanese Office Action dated Jan. 13, 2015 for Japanese Application No. 2012-552001, 3 pages.
Chinese Office action for Patent Application No. 03817091.4, dated Nov. 26, 2012, 4 pages.
International Preliminary Report Patentability and Written Opinion for PCT/US2011/022568, dated Aug. 14, 2012, 6 pages.
International Search Report for PCT/US2011/022568, mailed May 18, 2011, 2 pages.
Japanese Office action along with English translation for Patent Application No. 2012-552001, mailed Feb. 4, 2014, 7 pages.
Chinese Office action with English Translation for Patent Application No. 201180008782.8, dated May 11, 2015, 7 pages.
Chinese Search Report for Patent Application No. 201180008782.8, dated Apr. 28, 2015, 2 pages.
Japanese Office action with English Translation for JP Patent Application No. 2015-098379, dated Aug. 2, 2016, 11 pages.

* cited by examiner

PORTABLE CONTINUITY OBJECT

CROSS-REFERENCE TO RELATED APPLICATIONS

This application is a continuation of U.S. patent application Ser. No. 12/701,906 filed on Feb. 8, 2010, the entire content of which is incorporated herein by reference.

BACKGROUND OF THE INVENTION

1. Field of the Invention

The present invention is in the broad field of telecommunications, and pertains more particularly to enhancing continuity in communication transactions.

2. Description of Related Art

Call center (CC) operations and the machine intelligence providing many intelligent functions, such as agent-level routing, parallel data transfer and the like is a well-developed art. Most persons are familiar at least with contacting a call center in an attempt to access customer service for a hardware or a software problem or to update a product or software, for example. Such persons will understand that a service request may not always be satisfactorily resolved in a single call. Sometimes one or more call-backs will be necessary, and sometimes the requesting customer may have to be referred to another call CC or even another enterprise. Many products and services, for example, are provided through enterprise partnership.

Existing solutions typically require businesses (e.g. call centers) to maintain customer information and business context in some combination of locally managed systems, such as CRM systems, LDAP repositories, and so forth. Businesses typically supply customers with short tokens, such as case IDs and ticket numbers, and rely upon the customer to supply these tokens on subsequent inquiries related to the service. Subsequent interactions typically consist of a workflow at least similar to the following:

1. Customer interacts with business over some medium, and is prompted to recall the service token.
2. Agent and customer wait while the token ID is located.
3. Agent and customer wait while customer and service information is pulled from the CRM or other data repository.
4. Customer's identity is confirmed.
5. Service is continued.

This workflow simply reflects operations at a single call center, and the workflow becomes ever more complicated and more frustrating in the case of operations and multiple contacts spanning different call centers and different enterprises.

What is clearly needed is a portable continuity object that is not a captive of a single call center or a single enterprise, that will provide interfaces for obtaining and submitting business context and other data, providing a unified view of customer activity, thereby enabling enhanced personalization and continuity of service.

BRIEF SUMMARY OF THE INVENTION

The inventors have recognized a need for providing continuity across series of communication transactions, and accordingly have provided a method for providing continuity over a series of transactions, comprising the steps of (a) creating a Portable Continuity Object (PCO) as a defined digital package by an instance of PCO software executing on a computerized appliance also capable of communication transaction; (b) providing identity of a person, an address of a communication device and a continuity context in the PCO; (c) sharing the PCO in related transactions, with the PCO updated with information concerning individual transactions by digital equipment enhanced with an instance of PCO software; and (d) providing context continuity in succeeding transactions by accessing the PCO by one or both parties to a transaction.

In one embodiment changes made to a PCO are always copied back to a home storage for the PCO. Also in an embodiment accessing in step (d) is automatic by an appliance executing an instance of PCO software. In some embodiments accessing comprises displaying text, video and or providing audio via one or more peripherals coupled to the appliance.

In some embodiments the PCO is created and stored by at a station used by an individual initiating a first of a series of transactions. In other embodiments the PCO is stored at a third-party network location and is accessible and usable by PCO-compatible equipment at other locations.

In some embodiments of the method there are steps for storing in and executing machine-readable code from the PCO. The machine-readable code provides an interactive interface and interactivity with the interface makes alterations in data in the PCO.

In another aspect of the invention a Portable Continuity Object (PCO) for providing continuity over a series of transactions is provided, comprising a defined digital package created by an instance of PCO software executing on a computerized appliance also capable of communication transaction, identity of a person, an address of a communication device and a continuity context stored in the PCO, functionality in the PCO enabling updating of information in the PCO in related transactions, with the PCO updated with information concerning individual transactions by digital equipment enhanced with an instance of PCO software, and functionality in the PCO for accessing information in the PCO by one or both parties to a transaction.

In one embodiment of the PCO changes made are copied back to a home storage for the PCO. Also in an embodiment accessing information in the PCO is automatic by an appliance executing an instance of PCO software. Accessing information in the PCO may comprise displaying text, video and or providing audio via one or more peripherals coupled to the appliance.

In some embodiments the PCO is created and stored by at a station used by an individual initiating a first of a series of transactions. In other embodiments the PCO is stored at a third-party network location and is accessible and usable by PCO-compatible equipment at other locations.

In some embodiments there may be functions for storing in and executing machine-readable code from the PCO. The machine-readable code may provide an interactive interface and interactivity with the interface makes alterations in data in the PCO.

DETAILED DESCRIPTION OF THE INVENTION

Figure 1:
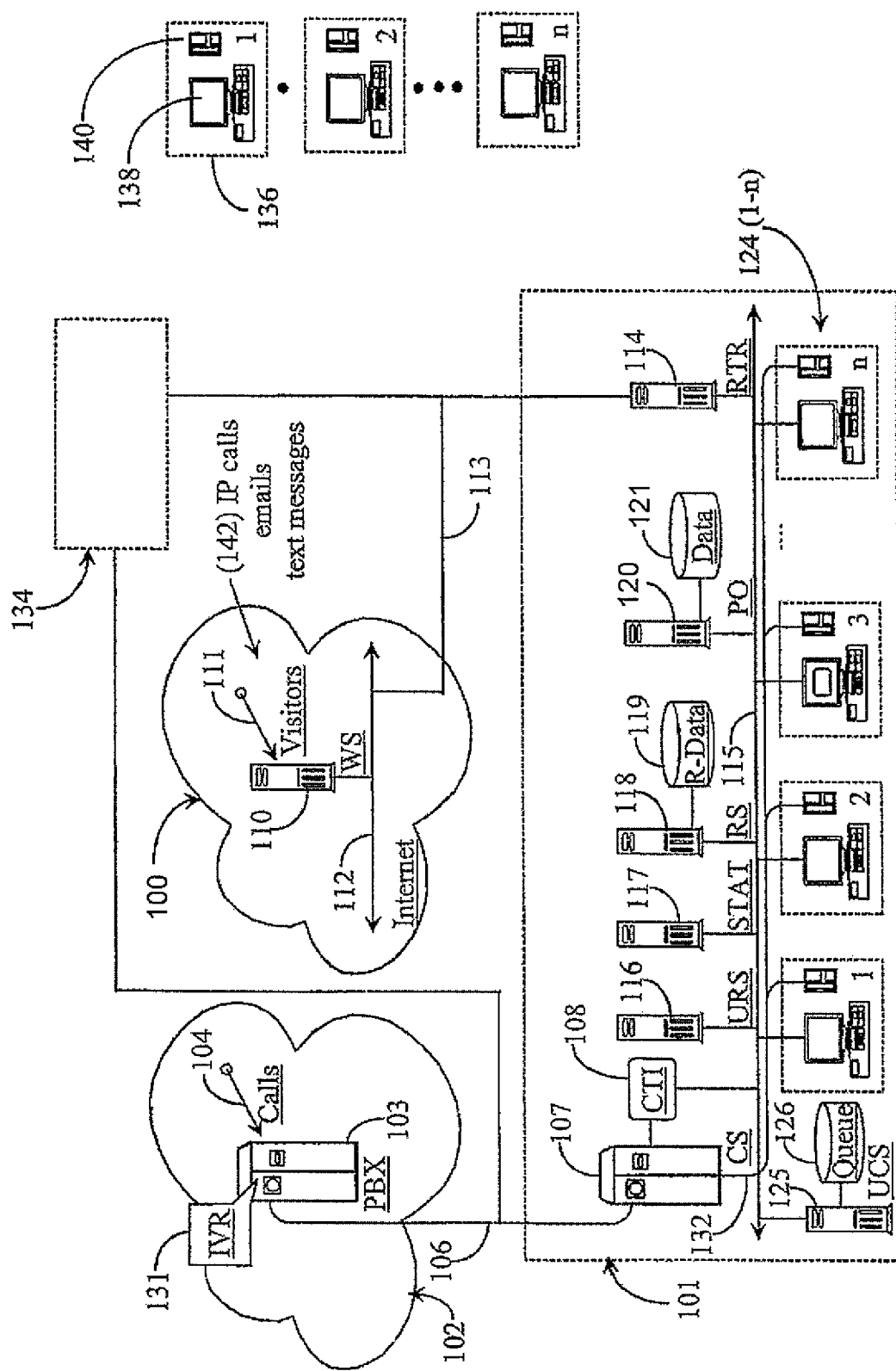
FIG. 1 is an architectural overview of a network wherein a portable continuity object may be used in an embodiment of the present invention.

FIG. 1 is an architectural overview of a network wherein a portable continuity object may be used in an embodiment of the present invention. Call center 101 is typical of many call centers in that it may be a dually-capable center, meaning that the center may process interactions sourced from a connected telephone network like a public switched telephone network (PSTN) 102 and interactions sourced from a connected wide-area-network like Internet network 100, both illustrated in this example logically using network cloud icons. Networks 100 and 102 are illustrated as physically separate from one another in this embodiment, however one with skill in the art of network communication will appreciate the physical ambiguity between the two networks in actual practice.

Call center 101 includes a local area network (LAN) 115 adapted in this example with transfer control protocol over Internet protocol (TCP/IP) and other network protocols required to enable LAN 115 as a connected sub-network of Internet network 101. LAN 115 supports an IP router (RTR) 114 having connectivity to an Internet network backbone 112 by way of an Internet access line 113. A variety of Internet connection techniques may be utilized to connect LAN 115 to Internet 100, including direct T-X connectivity on a 24/7 basis, broadband, wireless, digital subscriber line (DSL), Wireless Fidelity (WiFi) and so on. An Internet service provider (ISP) not illustrated may also be assumed present in this example in cases where service is brokered through a third party provider.

Call center 101 functions to service interactions (transactions, such as emails and voice calls) on behalf of one or more enterprises, and provides call center services to customers of those enterprises including, but not limited to sales and servicing of clients that patronize the one or more enterprises represented by the center. Backbone 112 in Internet 101 represents all of the lines, equipment, and connection points that make up the Internet network as a whole. Therefore there are no geographic limitations to the practice of the present invention. In some cases CC 101 is hosted by a single enterprise for servicing clients (customers) of that enterprise.

Backbone 112 supports at least one Web server (WS) 110 adapted to serve electronic information pages known in the art as Web pages typically maintained in the server as hypertext transfer protocol pages addressed by universal resource locator (URL) for electronic access by users operating Internet-capable appliances. An enterprise hosting call center 101 may maintain one or more Web sites having one or more associated Web pages in WS 110 that are accessible to the general public represented by an arrow 111 labeled "visitors". Visitors 111 represent any users accessing one or more Web pages of an enterprise served by call center 101. Such visitors may operate desktop computers, smart telephones, personal digital assistants (PDAs), laptop computers, or other Internet-capable appliances. Generally speaking, an enterprise represented by call center 101 and having a Web site accessible through WS 110 is a commercial enterprise engaged in sales and service to a customer base.

The Web site maintained by such an enterprise as described above may include a commercial page where customers may browse products and services and make online purchases. Other customer interfacing pages may also be present in an enterprise Web site such as a forum, a technical service page, an account management page, a registration page, a login page, a general contact page, and other informative Web pages that explain the benefits of products and services offered.

Call center 101 maintains a central office switch (CS) 107 within the call center physical domain. CS 107 may be an automated call distributor (ACD) type switch or a private branch exchange (PBX) switch or some other suitable switch capable of processing incoming telephone calls. CS 107 is computer telephony integrated (CTI) by a CTI processor 108 connected to the switch by a CTI link. CTI processor 108 provides intelligent call processing control to switch 107. CS 107 has connectivity to a local network switch 103 in PSTN 102 by way of a telephone trunk 106. Switch 103 is a PBX switch in this example and may also be enhanced for call processing control intelligence by a CTI processor maintained at network level, but not shown.

CTI processor 108 is connected to LAN 115 within call center 101. In this way information solicited from callers registered at switch 103 may be routed over LAN to agents even before incoming calls are connected to the agents. PBX 103 may have an instance of interactive voice response (IVR) 131 adapted to interface with callers that call into call center 101 using some provided number such as a toll free 1-800-number registered at switch 103. PSTN calls into switch 103 that are destined for call center 101 are represented herein by a directional arrow labeled "calls" with the element number 104. Due to the seamless nature of network bridging, calls into switch 103 may source from anywhere in a connected telephone network or from anywhere in Internet 100 such as by using voice over Internet protocol (VoIP).

CS 107 is connected to internal call center telephones by way of internal telephone wiring 132. LAN 115 supports agent workstations illustrated herein as stations 124 (1-n). Each agent workstation 124 (1-n) has a computer appliance and a telephone appliance in this example. Agent workstations 124(1-n) are typically manned by live call center agents who handle interactions incoming into the call center through call center access points switch 103 and switch 107 or WS 110. Agents may handle voice calls, email requests, and may also engage customers through a chat interface or an instant message interface. More equipment may be present within the agent workstations without departing from the spirit and scope of the present invention. In this example, each telephone in agent workstations 124 (1-n) has a connection to switch 107 via internal telephone wiring 132. Each computing appliance illustrated in this example is LAN connected. It will be apparent to the skilled artisan that the hardware/software mix at an agent station may vary considerably from the example described.

Digital transactions may be routed to agents operating at stations 124 (1-n) through RTR 114. Transactions incoming to center 101 may be intercepted at switch 103 by IVR 131 before being forwarded to switch 107 for final destination routing. Utilizing IVR services at the network level allows for agent level routing occurring at switch 107. In one embodiment CTI and IVR enhancement is provided in switch 107 instead of at switch 103 within PSTN 102.

A Web page belonging to a company Web site may include contact options that users may launch or initiate from the Enterprise Internet site. For example, a floating or static contact interface may be provided within a contact page or other Web page that contains several options for users to engage call center resources. Typical options include email, chat, and scheduled call back options. In some cases an inbound toll free number is provided for placing an immediate inbound telephone call into the call center.

LAN 115 supports a statistics (STAT) server 117 adapted to compile real-time and predictive statistics relative to call center resource states and operations. STAT server 117 has a digital medium provided therein or made accessible thereto for storing the data and SW enabling server function. Servable statistics may include estimated waiting time (EWT) in queue, actual call load incoming into the center for routing, predicted call loads projected out in time, and actual and predicted availability statistics on resources of the call center, more particularly, live agents.

LAN 115 supports a universal routing server (URS) 116 adapted to provide intelligent routing instruction upon request to systems like IVR 131 and RTR 114. URS 116 may subscribe to certain statistics to aid in determination of availability for routing interactions. LAN 115 supports a universal connection server (UCS) 125 adapted to provide a universal record of ongoing and queued interactions of any supported media type as well as to record statistics relative to processing and state of those ongoing and pending interactions. URS 116 and UCS 125 have digital mediums provided therein or otherwise made accessible thereto that contain all of the data and SW to enable server function. A general queue 126 is illustrated in this example and is connected to UCS 125. Queue 126 logically represents interactions that have been routed and are waiting in queue for available resources like live agents for example.

Callers into center 101 that are registered with switch 103 are monitored during the IVR prescreening by a monitoring SW 130 running on CTI processor 105. IVR callers may be monitored for interactive behavior, mood, and, or interactive responses to IVR prompts. The monitoring process detects all of the callers and monitors the interactions of each caller with the IVR. LAN 115 supports a ranking server (RS) 118 that is adapted to rank the importance of callers monitored during IVR interaction by monitoring SW 130 with the aid of a ranking SW 129 running on the ranking server. Ranking server 118 has a digital medium provided therein or otherwise made accessible thereto for enabling server function.

A data repository 119 labeled R-Data for reservation data is provided and connected to RS 118 running ranking SW 129. Repository 119 contains call reservation data relative to reserved call opportunities made available to visitors 111 and callers 104 as a result of favorable ranking. For example, qualified callers 104 interacting with IVR 131 may be offered a call reservation opportunity at a later time if current statistics indicate that there are no available resources within the center to handle the call immediately. Likewise, repository 119 contains call reservations made available to Web visitors 111 who are qualified and where no available resources are available to handle immediate live interaction. In this specification the distinction between callers and visitors is that visitors are accessing a Web-based access point whereas callers are interacting by voice call. However, in the abstract sense, visitors and callers are treated much in the same way through their respective interfaces. Therefore the term visitor may be used in this specification to refer to both callers and Web visitors.

A Portable Object Server 120 connected to LAN 115 executes software from a machine-readable medium for dealing with Portable Objects (PO) that are a subject of the present patent application. Server 120 is coupled to a dB 121 in which portable objects may be maintained in an embodiment of the invention.

A second call center 134 is indicated in FIG. 1, and may be implemented and structured much like CC 101, or may be structured and implemented much differently than CC 101. CC 134 may be hosted by the same enterprise that hosts CC 101, perhaps in a different geographic region, or may be hosted by a different enterprise entirely. While two call centers 101 and 134 are indicated, there may be many other call centers hosted by many other enterprises in such a network, and incoming calls and other digital transactions may be routed to any one of such call centers.

Stations 136 1-$n$ in FIG. 1 represent communication stations and appliances operated by individual persons who may request service from any one of the call centers in the network represented in FIG. 1. These appliances and stations may include personal computers or laptops 138 and individual telephony appliances 140, which may be connection oriented telephones, cellular telephones, IPNT telephones, or any other sort of digital appliance that may support an ability to transact with one of call centers represented in the network by CC 101 and 134. Individuals using these appliances may initiate and conduct transactions with IVRs and agents at call centers in the network. Individual ones of the stations 136 may be connected into the overall network in one or more of several ways, such as by connection-oriented switched telephony (COST) apparatus, by cellular network, or by Internet connection of any known type and structure. Generally persons operating appliances represented by stations 136 may transact with CCs to request and receive services of various sorts. Stations 136 are sources for COST calls 104, IP calls 142, and web visits 111.

As described in the Background section above, persons transacting with call centers represented by CCs 101 and 134 may request and receive services over a series of transactions, rather than all in a single transaction, before a satisfactory conclusion to a transaction purpose is concluded, and in the current art there may be clumsy delays and errors made because of a lack of ability to quickly provided continuity between transactions that are related to a single or two closely related purposes. The inventors provide a Portable Continuity Object (PCO) to enhance ability to quickly relate separate transactions to provide continuity in context. Such an object may take any one of several forms, but in general is a standardized coded digital package, similar in some respects to a digital data packet, having headers and a data body. The PCO is capable of being stored in and retrieved from data bases and other data repositories, and may be attached to transactions such as emails, and transmitted in-band or out-of-band with voice data streams of telephony transactions.

Figure 2:
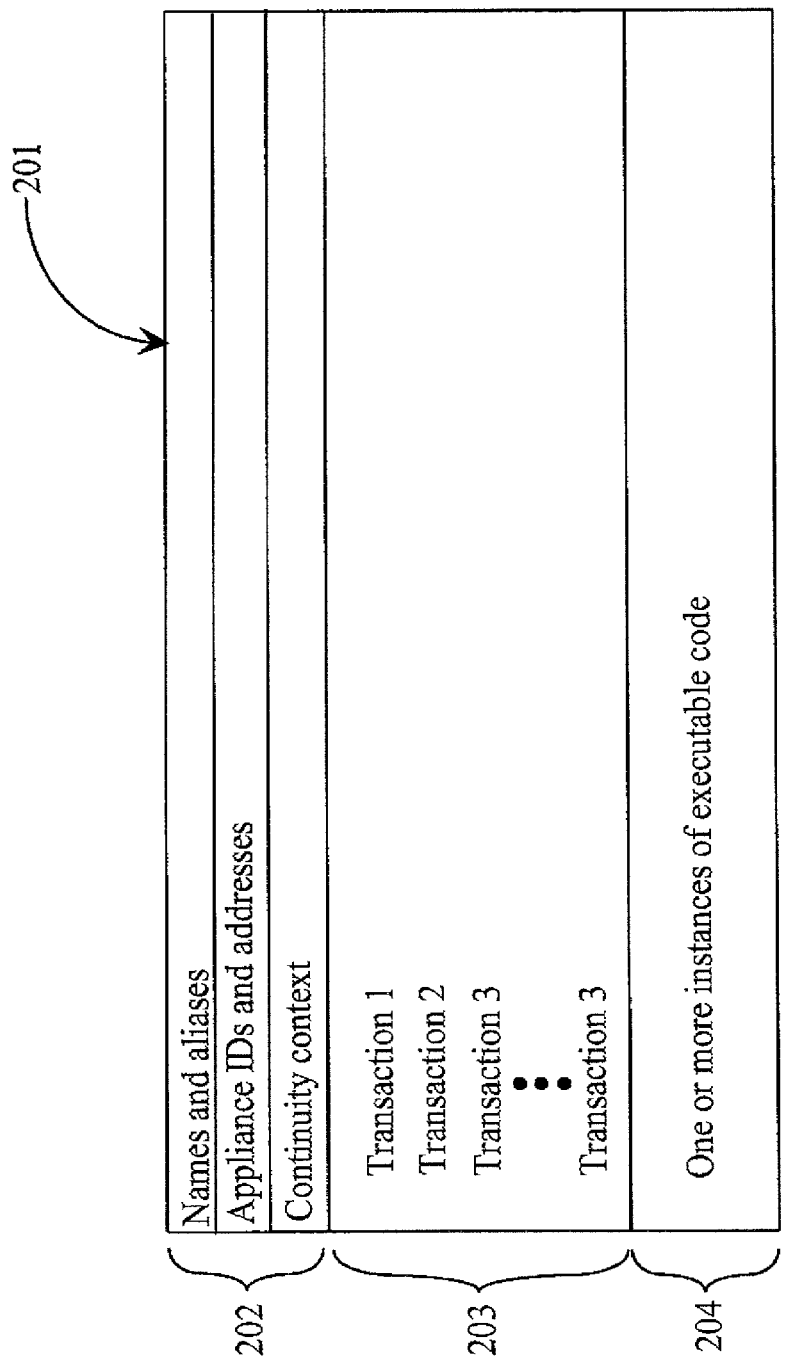
FIG. 2 is a diagrammatical representation of a portable continuity object in an embodiment of the invention.

FIG. 2 is a diagram of a simplified example of a PCO 201 in one embodiment of the invention. PCO 201 is in this example a package of both data and executable code, although both are not required in all instances to constitute a PCO in an embodiment of the invention. PCO 201 has three defined sections 202, 203 and 204. Section 203 encompasses data entities that serve to identify a person, or in some cases more than one person, communication appliances that are or may be associated with that person or persons, and an indication of a continuity context.

Typically a series of related transactions will be accomplished by one person, but in some cases more than one person. A man and wife may, for example, initiate and conduct transactions all related in a single context, for example arranging a loan with a bank, the loan to which both parties may be jointly responsible. In another example, a person who initiates a series of context-related transactions may appoint another person to continue the series to a logical conclusion. So the header portion for names and aliases will usually be one name, but in some cases may be several.

A singular purpose of the PCO is to provide quick association and context between related transactions in a communication environment that may encompass several networks and protocols. A person may begin such a series by a visit to a web site using a lap-top computer, and may continue with a series of VoIP calls interspersed with emails sent from the same computer, or a different computer appliance, that was used in the original web visit. For this reason IP addresses of appliances, telephone numbers and the like are all associated with the persons and the transactions and added as context-related transactions proceed.

In addition to names and addresses, in a PCO a relationship needs be identified. This relationship is the glue that binds the rest of the data and code of the PCO. Typically a person will initiate and cooperate in a transaction for a purpose, and that purpose may not be fulfilled. It is that purpose that is the binder, but it is not necessary that the purpose be spelled out in detail to provide the context. It is enough that an identifier be applied, which may be one of a series in a standardized library, that may be used to relate one transaction to a next transaction. This identifier is the continuity context.

It has been thus far described that the continuity is between transactions that are conducted on the way to a hopefully successful conclusion of an initial purpose. An important part of the PCO therefore is a body 203 wherein at least summaries of transactions may be recorded. In one instance entire transactions (emails, recorded voice calls, text messages, etc.) may be recorded, typically in chronological order. In other instances transactions may be reduced to metadata, or coded indications of progress. These transaction recordings are retrievable and reviewable in a variety of protocols. For example, a PCO that records a series of transactions for a person in a context may have been last interrupted by an email transaction, and now the person makes a COST call to a CC to (hopefully) conclude a purpose. The PCO may accompany the COST call or be transmitted in an alternate path to an agent to whom the COST call is routed. In the process the previous transactions may all be translated into a form that the agent may access and review, depending on the agents hardware and software capability. In one embodiment this may be done by recording each transaction in several protocols allowing access and review by a variety of equipment and communication protocols.

As described briefly above, a context will typically be created by an unsuccessful conclusion of a transaction. If the purpose is fulfilled in the original transaction, there is no need for a PCO. But in some cases the purpose may change in the course of two or more transactions. In that case the content of the transactions will indicate the direction and probable outcomes.

Another important piece of a PCO in some embodiments is executable code. 204. In some embodiments a summary of a previous transaction, when a new transaction is in a different protocol, may be rendered in real time as needed by the new transaction, using code called from portion 204. Code here may also be called to do a variety of other tasks, or to call code from external sources to accomplish certain tasks, such as broadcasting transactions on different networks in search of information or solutions to purpose in context.

The PCO introduces a structured model and interfaces for managing service and business context. Context may be generated by any customer service application, be it running in a contact center, hosted in a network, or running on the subscriber's communication device. The PCO may be stored, and advantageously so, on a communication appliance used by a person seeking service, and/or centrally in the cloud or carrier network. Moving business context to the communication device, cloud, or network enables stateless contact center operation. Interfaces are exposed allowing applications to receive or retrieve this context for the purposes of continuing or personalizing a given service.

Figure 3:
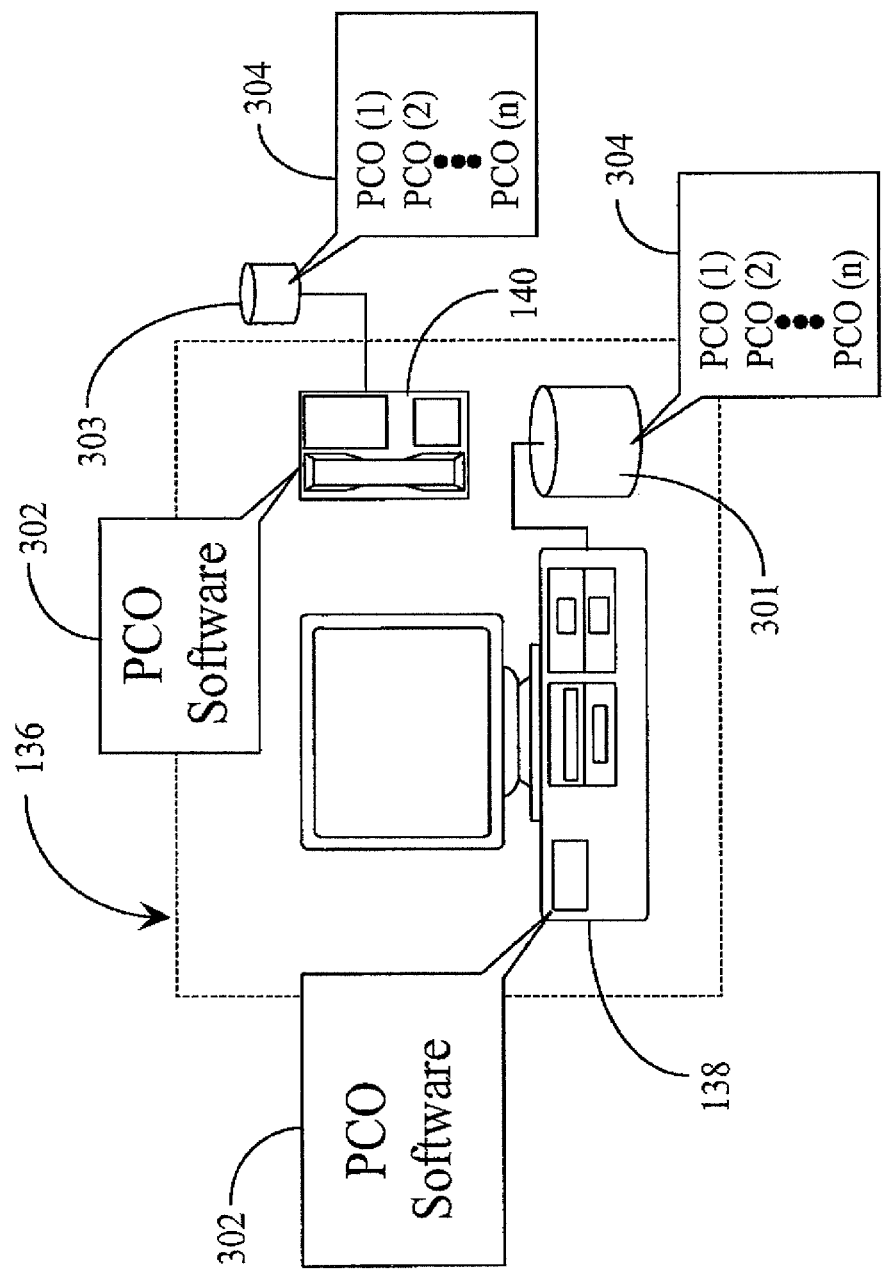
FIG. 3 is a diagram representing elements and functionality at a computerized station in an embodiment of the invention.

To create and use PCOs in embodiments of the present invention requires an instance of compatible software executing from a machine-readable medium on the appliance where creation and/or use occurs. FIG. 3 is a diagram illustrating one of the stations 136 of FIG. 1 in additional detail. In this example station 136 comprises a personal computer 138 with a display monitor and a telephone appliance 140. Computer 138 may be any one of several known personal computing appliances, such as a laptop, a PDA, a desktop computer, or any one of several others, and Internet connectivity is provided for computer 138 in any one of a number of known ways. Appliance 140 may be a COST telephone connected to a COST line, a cellular telephone, a smart phone, or any other known sort of telephony-capable communication appliance. In some cases appliance 140 may be connected and enabled through computer 138. In some cases appliance 140 may have Internet connectivity separate from computer 138, such as through a cellular network. The representation of station 136 is meant to comprise any of a broad variety of customer premises equipment (CPE) that is be capable of supporting communication transactions in embodiments of the present invention.

Computer 138 at station 136 in this example comprises a data repository 301 for mass storage and SW storage, and an instance of PCO Software 302 executes from memory 301 on computer 138. Computer 138 may be the only communication device at station 136, and may be enabled by other SW to browse the Internet and to accomplish Internet Protocol Network telephony (IPNT). Similarly telephony device 140, which may be any one of several available devices as described briefly above, may be the only communication device at the station, and may have local memory 303 for data and SW. An instance of PCO SW 302 may execute on telephony device 140.

Assume for sake of example that computer 138 is the only or the primary communication device. In this example, in one embodiment of the invention, a user associated with computer 138 may make a call to a call center to seek aid in re-installing an instance of an application previously purchased and installed, that has begun to exhibit some problems in execution. In this example, with SW 302 executing, the SW will monitor the communication activity of the user with respect to computer 138. This activity may include web browsing, emails, IPNT calls, and so on. Under certain pre-programmed instances SW 302 will create a new PCO and store that in data repository 404. In one embodiment every instance of communication initiation, such as sending an email or placing a call, will result in a new PCO. At the end of the communication transaction, or after a timeout, the new PCO may be automatically deleted.

A new PCO created will be populated with the user's names and aliases, the computer's IP address or a virtual telephone number, and a record of transaction #1. It may be, of course that the PCO is redundant and not needed. In the present example, however, we have assumed the user is calling a call center to address the issue of the misbehaving software application. Assume now that the PCO has been created, and the user is connected to an agent at the CC. Assume as well that the CC is enabled with compatible PCO SW operable at the agent's station. The PCO SW at the agent's premise discovers that the caller is PCO, and retrieves a copy the new PCO from the caller. This may happen through an Internet parallel pathway, in-band signaling, or by any of several procedures. In some case the CC may have record of the caller and stored knowledge that the caller is PCO compatible. In other cases there may be a pinging procedure for discovery.

In the course of the transaction the agent discovers the identity of the problem software, the configuration of the platform 136 that normally executes the software, and the nature of the problem (it is an email client that no longer will allow the user to delete emails from the inbox). The PCO SW at the CC populates the PCO with a continuity context as described above, and records the salient information about the problem the transaction, and so on.

It happens that the agent at the CC is not qualified to correct the problem for the caller, and instead determines to transfer the caller to another agent at another CC, hosted by the same enterprise, that has an a agent eminently qualified to handle the problem. The caller is transferred, holds a short time in queue, and is connected to the new agent. The PCO, newly populated by the first agent, accompanies the transfer and is also copied back to the caller and updated in PCO records 304 in data repository 301.

Now the value of the PCO becomes more apparent. When the caller is connected to the new agent, the PCO is displayed to the new agent, who has immediate access to the record of the first transaction, which comprises the information about the application, the platform, the nature of the problem and so on. It is not necessary for the second agent to elicit the information anew from either the caller of the first agent. Time is saved, satisfaction is more probable.

The second agent now leads the caller through a series of steps designed to solve the problem; but fails. The second transaction is recorded, at least in summary detail, and the result is added to the PCO, which is copied back to the caller's premise (memory 301). In the course of the second transaction the second agent authorizes a replacement copy of the misbehaving application, free of charge. To get the new application the customer has to visit a web site hosted by the enterprise. This info, including the authorization, is copied to the PCO.

The next day the caller uses the web browser of computer 138 to visit the web site, the URL of which was provided by the second agent. The web site is PCO as well, and retrieves a copy of the PCO when the original caller visits, and uses the transaction information to connect the visitor to a page that has download facility for the needed application, and also accesses a code that the download has been authorized by the second agent. The download takes place smoothly. This information is added to the PCO and copied back to the person who originated the continuity.

In some embodiments there may be a mechanism for the person at station 136 to indicate, relative to a series of transactions, that the goal is achieved, at which point the PCO may be deleted. In other embodiments, PCOs are stored beyond satisfactory (or unsatisfactory) completion of a context, and may be slated for elimination by age, say after one or two years. This latter process may be preferable, because, in some instances, a context thought to be completed may be revived at a later time, and an original PCO may be retrieved, and may prove to be useful. In other embodiments PCOs may simply be archived to, for example, removable memory.

In the example just discussed above, PCOs are originated by a person making an original call, and other facilities, such as web sites and call centers, may be enabled with compatible software to deal with and utilize PCOs. It is of course necessary that transacting parties, through premises equipment, be enabled to process the PCOs. It is not necessary, however, that the originating caller create, populate and store and update the PCOs. For example, essentially the same system described above may be operable either as a server of client system at a CC, and the call-center may initiate, store, populate and update the PCOs. PCOs may also be stored and retrievable from a network site, either associated with a service provider, or as a third-party service. In this case PCOs may be originated, populated and updated by any transaction premise equipment that is compatible and enabled, and may be transmitted to the third-party storage, where synchronization always takes place.

There are other uses and functionality that may be integrated with PCOs as will be understood from the following use case. In this example a customer, using a Smart Phone, calls a travel agency CC and buys a vacation package from an agent at the CC. Either the customer or the CC originated a PCO. The PCO is copied to the customer repository 301. In the course of the purchase transaction, as a first transaction, an actionable itinerary is logged into the PCO. This becomes a part of portion 204 of the generalized PCO of FIG. 2. In the vacation package the customer has paid for attendance at an opera in a city on the itinerary, and a bullfight at another city. Although these are paid, both require choice of day and time within the itinerary window. The PCO alerts the customer and enables choices to be made, which are then transmitted to the necessary places. Once selected options are confirmed, the itinerary is automatically updated. Later, the customer may choose to perform other updates to the itinerary.

Closer to travel date the actionable itinerary of the PCO alerts the customer for advance flight check-in and prompts discounted upgrade to business class. Later the itinerary may alert the customer on other upcoming events.

Given the examples and use cases described herein, it should be apparent to the skilled artisan that the PCO is indeed a unique digital Portable Continuity Object, that may be created, stored in various places, and updated through a series of transactions, over a variety of networks, and in a variety of protocols, saving considerable time and effort in transacting business and pleasure. It will also be apparent to the skilled artisan that the examples described are truly examples of a much broader system and entities, and many different use cases might be described, all within the breadth of the invention. The invention is limited only by the claims that follow.

The invention claimed is:

1. A method for providing continuity over a series of transactions, the method comprising:
    detecting, by a processor, a first communication session with a computerized appliance, wherein the first communication session is for engaging in a transaction;
    accessing, by the processor, a data packet during the first communication session;
    storing, by the processor, into the data packet, context of the transaction and an executable code, wherein the executable code is configured to prompt an action to be taken in regards to the transaction;

transmitting the data packet to the computerized appliance for storing in a memory device coupled to the computerized appliance; and running, by the computerized appliance, the executable code retrieved from the data packet and changing, in response to running the executable code, a parameter associated with the transaction, wherein the running of the executable code displays a prompt on the computerized appliance at a time after end of the first communication session, wherein in response to the prompt, a user input is received via the computerized appliance.

2. The method of claim 1, wherein the context of the transaction includes a record of the first communication session.

3. The method of claim 2, wherein the record of the first communication session includes an audio recording of a communication exchanged during the first communication session.

4. The method of claim 1, wherein the context of the transaction includes an address of the computerized appliance.

5. The method of claim 1, wherein the data packet is configured to be generated by the computerized appliance and transmitted to the processor for engaging in the first communication session.

6. The method of claim 1 further comprising:
generating, by the processor, the data packet in response to establishing the first communication session.

7. The method of claim 1, wherein the computerized appliance is a mobile device configured for telephony communication.

8. A system for providing continuity over a series of transactions, the system comprising:
processor; and
memory, wherein the memory has stored thereon instructions that, when executed by the processor, cause the processor to:
 detect a first communication session with a computerized appliance, wherein the first communication session is for engaging in a transaction;
 access a data packet during the first communication session;
 store, into the data packet, context of the transaction and an executable code, wherein the executable code is configured to prompt an action to be taken in regards to the transaction;
 transmit the data packet to the computerized appliance for storing in a memory device coupled to the computerized appliance;
 run the executable code retrieved from the data packet and change, in response to running the executable code, a parameter associated with the transaction, wherein the instructions that cause the processor to run the executable code include instructions that cause the processor to display a prompt on the computerized appliance at a time after end of the first communication session, wherein in response to the prompt, a user input is received via the computerized appliance.

9. The system of claim 8, wherein the context of the transaction includes a record of the first communication session.

10. The system of claim 9, wherein the record of the first communication session includes an audio recording of a communication exchanged during the first communication session.

11. The system of claim 8, wherein the context of the transaction includes an address of the computerized appliance.

12. The system of claim 8, wherein the data packet is configured to be generated by the computerized appliance and transmitted to the processor for engaging in the first communication session.

13. The system of claim 8, wherein the instructions further cause the processor to generate the data packet in response to establishing the first communication session.

14. The system of claim 8, wherein the computerized appliance is a mobile device configured for telephony communication.

15. The method of claim 1, wherein the user input relates to a future event.

16. The method of claim 1, wherein the transaction is purchase of a vacation package.

17. The system of claim 8, wherein the user input relates to a future event.

18. The method of claim 8, wherein the transaction is purchase of a vacation package.

* * * * *